US006743277B2

United States Patent
Goodell et al.

(10) Patent No.: US 6,743,277 B2
(45) Date of Patent: Jun. 1, 2004

(54) SERVICE RESERVOIR PURGE OF AIR DRYERS IN PUMP-OFF MODE

(75) Inventors: David J. Goodell, Beaverton, OR (US); Charles e. Eberling, Wellington, OH (US)

(73) Assignee: Bendix Commercial Vehicle Systems LLC

( * ) Notice: Subject to any disclaimer, the term of this patent is extended or adjusted under 35 U.S.C. 154(b) by 32 days.

(21) Appl. No.: 10/147,559

(22) Filed: May 16, 2002

(65) Prior Publication Data

US 2003/0213361 A1 Nov. 20, 2003

(51) Int. Cl.[7] ................................................ B01D 53/04
(52) U.S. Cl. ...................... 95/19; 95/121; 55/DIG. 17; 96/114; 96/130; 96/400; 280/837
(58) Field of Search ................................. 55/385.2, 420, 55/DIG. 17; 95/19, 90, 117, 121, 122, 148; 96/108, 109, 113–115, 121, 130, 143, 188, 399, 400; 303/85; 280/837, 828, 839; 34/333, 80

(56) References Cited

U.S. PATENT DOCUMENTS

| 3,714,763 A | * | 2/1973 | Suzuki | .......................... 96/113 |
| 4,007,021 A | * | 2/1977 | Gyllinder | ..................... 95/123 |
| 4,272,089 A | * | 6/1981 | Watkins, Jr. | ................. 280/837 |
| 4,673,222 A | * | 6/1987 | Knight | ............................ 303/9 |
| 5,103,576 A | * | 4/1992 | Cramer et al. | ................. 34/549 |
| 5,145,495 A | * | 9/1992 | Elamin | ......................... 96/114 |
| 5,186,522 A | * | 2/1993 | Spencer | ......................... 303/1 |
| 5,378,266 A | * | 1/1995 | Elamin | ......................... 96/114 |
| 5,458,676 A | * | 10/1995 | Herbst et al. | .................. 96/109 |
| 5,592,754 A | * | 1/1997 | Krieder et al. | ................. 34/527 |
| 6,074,177 A | | 6/2000 | Kobayashi et al. | |
| 6,074,462 A | * | 6/2000 | Quinn et al. | ................... 96/113 |
| 6,077,330 A | * | 6/2000 | Sabelstrom | .................... 95/11 |
| 6,120,107 A | * | 9/2000 | Eslinger | ........................ 303/1 |
| 6,234,586 B1 | * | 5/2001 | Davis et al. | ................... 303/89 |
| 6,425,935 B1 | * | 7/2002 | Amato et al. | ..................... 95/1 |

* cited by examiner

*Primary Examiner*—Frank M. Lawrence
(74) *Attorney, Agent, or Firm*—Calfee, Halter & Griswold LLP

(57) ABSTRACT

A cargo or bulk product off-load system includes a compressor (10) that pressurizes air. The air is dried by a dryer (12, 14) and routed to a supply tank (16). From the supply tank, the air is either used to pressurize service reservoirs (24, 26) or to assist the off-load system. Air stored in the service reservoirs (24, 26) is used to pressurize purge volumes associated with the dryers (12, 14). The compressor (10) operates at a lower pressure when supplying air to assist the off-load system than when pressurizing the service reservoirs (24, 26). Controllers (30, 40) coordinate switching of airflow, and alternating purging and drying of the dryers.

28 Claims, 2 Drawing Sheets

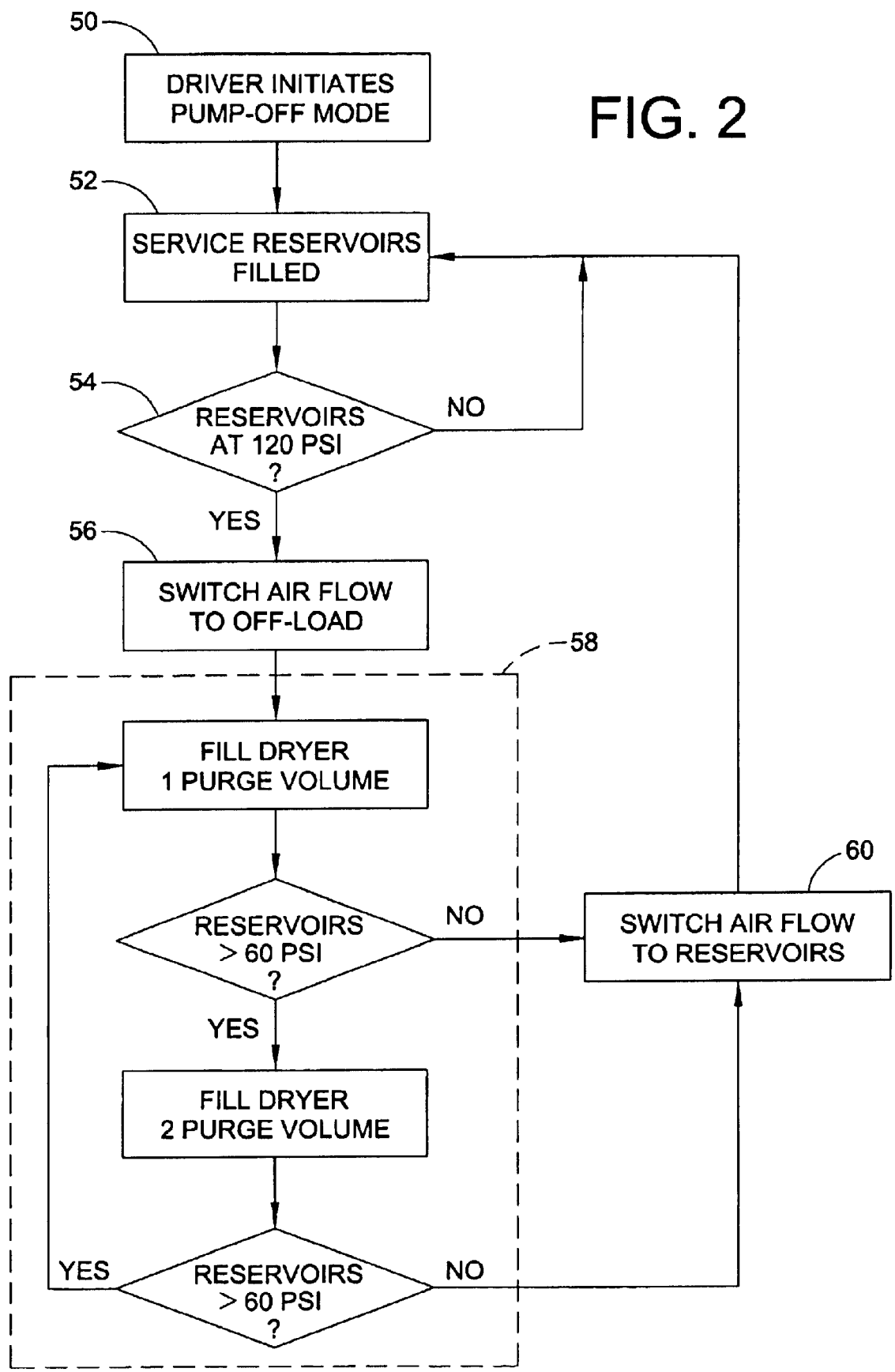

SERVICE RESERVOIR PURGE OF AIR DRYERS IN PUMP-OFF MODE

BACKGROUND OF THE INVENTION

The present invention relates to the automotive vehicle arts. It finds particular application in conjunction with off-loading cargo from tanker trucks or tractor trailer combination vehicles and will be described with particular reference thereto. It will be appreciated, however, that the present invention is also applicable to other fields and is not limited to the aforementioned application.

Typically, when a tanker truck is ready to off-load a bulk product, a driver applies a parking brake, and any other safety measures to keep the truck or tractor trailer stationary before off-loading. With many products, the off-load process is pressurized to assist flow of product from the tank. This quite often is a lengthy process, sometimes taking in excess of five hours.

Tanker trucks are equipped with pneumatic hardware that in normal operation is used to provide pressure for various air operated devices such as brakes. When the driver activates the pump-off mode, the pneumatic system supplies pressure to the truck bulk tank or trailer bulk tank.

To avoid complications, compressed air is dried and often filtered before it is used in pneumatic applications. Typically, the compressor is run at a constant pressure, e.g., on the order of about 85 psi or about 590 kPa, during pump-off. This pressure is required so that there is sufficient back pressure to fill purge volumes of the dryers for regenerating the desiccant that adsorbs moisture from the compressed air system. As is known, the purge volumes included in commercially available air dryers flush moisture from the dryer after it has been operating for a predetermined time. During a charge cycle, high pressure is used for adsorption and moisture is removed from the compressed air and retained by the desiccant. During the desorption process, the desiccant is regenerated at low pressure by using high pressure and expanding through an orifice. So, in a conventional system, a pressure protection valve is provided and the rest of the system backs up or builds to the level of this valve. The volume of the stored air is then expanded so that if the pressure protection valve is eliminated, then the system can operate at less than 20 psi. This is an inefficient process given that the compressor is running at an elevated level such as a constant 590 kPa when a reduced pressure, typically on the order of 20 psi or 135–175 kPa, is adequate to off-load the tank. In other words, the compressor is working harder than it needs to thereby shortening its overall life. Additionally, the compressor flow is higher when operating at lower pressures.

Pump-off systems commonly employ a pressure regulation valve. Typical tankers handle 20 psi or 135–175 kPa during the off-load process. Since the compressor is running at higher pressure to enable the dryers to be properly purged as noted above, this valve is included to reduce the pressure (e.g. to 135–175 kPa) for the pump off process.

The present invention provides a new and improved method and apparatus that overcomes the above referenced problems and others.

SUMMARY OF THE INVENTION

In accordance with one aspect of the present invention, a system for providing pressure to assist a cargo off-load is provided.

A preferred embodiment of the invention includes an air compressor supplying pressurized air to the associated bulk product off-load. A dryer removes moisture from the air supplied by the compressor. A brake system service reservoir(s) provides compressed air for purging the dryer of moisture, thereby allowing the compressor to operate at a reduced pressure level and increased efficiency.

In accordance with another aspect of the present invention, a method of off-loading product from a tanker truck is provided. The method includes the steps of supplying pressurized, dry air to a product tank and purging the dryer with air from a service reservoir.

In accordance with another aspect of the present invention, a tanker truck has a cargo hold for retaining a flowable bulk product and a pressurized off-load assist system. The off-load assist system alternately compresses air at high and low pressures, the high pressure being used to pressurize at least one service reservoir, and the low pressure being used to pressurize an off-load.

One advantage of the present invention resides in more efficient compressor operation.

Another advantage relates to longer compressor life.

Another advantage is realized by faster bulk product off-load times.

Still another advantage is the improved utilization of existing hardware.

Still further benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 2 is a flowchart summarizing an air compression cycle in accordance with the present invention.

DETAILED DESCRIPTION OF THE PREFERRED EMBODIMENT AND METHOD

Figure 1:
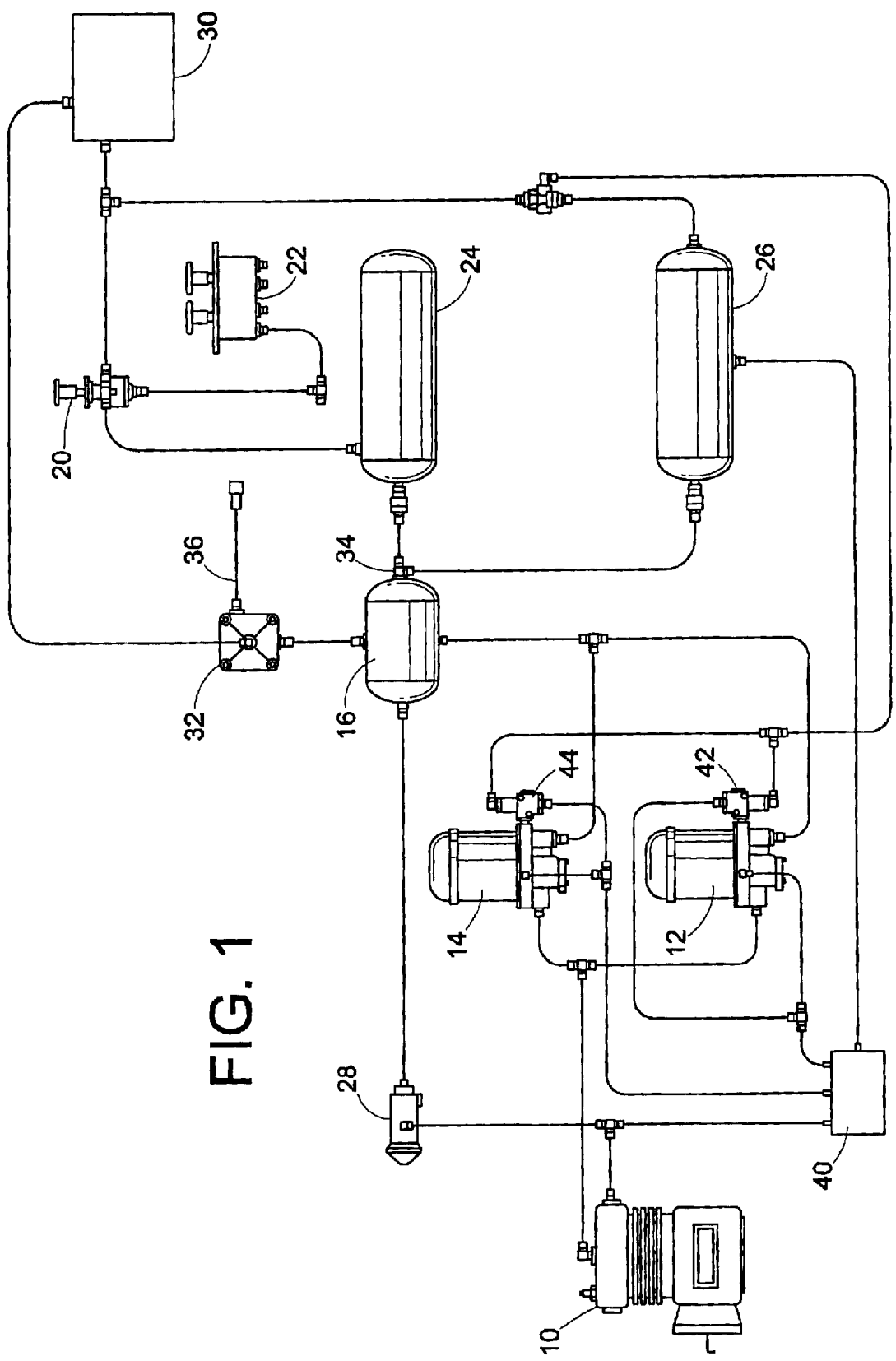
FIG. 1 illustrates an air pressurizing system in accordance with the present invention.

With reference to FIG. 1, a compressor 10, such as a commercially available Bendix Duraflo 596 air compressor, supplies pressurized air to a cargo or bulk product off-load system. Pressurized air from the compressor 10 is passed through dryers 12, 14, removing moisture therefrom. The dryers 12, 14 in the preferred embodiment are standard desiccant bed air dryers as are known in the art. Dry air from the dryers passes to a supply tank 16.

Once the driver has parked the truck, a pump-off mode of the truck is initiated to unload the bulk product from the tanker truck or tractor trailer. For example, a control switch 20 mounted within the cab of the truck is actuated to begin the pump-off process. A control valve 22 operates the park brake (not shown), for example, by pulling the valve handle to actuate the park brake and pushing the handle to release the park brake. As is generally known, the park brake is actuated by releasing air that counteracts the spring brakes used for parking purposes. If the park brake is "off", then the bulk product unload system cannot be used. Reservoirs 24, 26 are used to supply the brakes with pressurized air. Likewise, after pump-off mode has been initiated, the control valve 22 will not allow the truck to be moved until pump-off mode has been terminated.

When the pump-off mode is initiated by the driver, the primary and secondary service reservoirs are usually filled. The supply tank 16 routes dry air to fill the reservoirs 24, 26. A pressure monitor 28 signals when the service reservoirs have been pressurized to a predetermined level, for example 120 psi or 830 kPa. The pressure in the service reservoirs is also monitored by a governor control 30. The governor control controls a pump-off control valve 32. When pressure in the service reservoirs reaches the desired level, e.g., 830 kPa, the governor control 30 opens the pump-off control valve 32. Concurrently, the supply tank 16 routes the dry air to the pump-off control valve.

At this point, service tank check valves 34 are closed, isolating the service reservoirs 24, 26 from the supply tank 16. When the pump-off control valve 32 is open, compressed air from the supply tank travels to a supply line 36 to the pump-off system/process. In the preferred embodiment, once the service reservoirs are filled to the desired level, the compressor 10 no longer operates at such high pressure. Preferably, the operating pressure is backed down to between approximately 100 and 200 kPa depending on cargo or bulk product specifications. This allows the compressor to operate at a reduced pressure that is more efficient, as it increases its output, draws less power, and does not work as hard.

In the preferred embodiment, the first and second dryers 12, 14 alternate to dry air that is supplied to the supply tank. As a dryer is operating, moisture collects in a desiccant bed of the dryer and eventually saturates the dryer to the point where it no longer properly dries the air. When a dryer nears the point of saturation, its desiccant bed is dried by directing dry, pressurized air in a reverse direction through the desiccant bed, venting it to atmosphere, and removing the built up moisture with the reverse or purge flow. Dry air for purging is stored in a purge volume, integrated within the dryers in the preferred embodiment, although it will be understood that the purge volume could also be separate from the dryer without departing from the scope and intent of the present invention. The purge volumes are normally maintained at a predetermined pressure, for example no less than approximately 410 kPa, in order to efficiently remove moisture from the desiccant bed of the dryer.

In the preferred embodiment, a dryer control module 40 selectively switches air flow from the compressor from one dryer to another based on the average time it takes for a dryer to reach saturation. Alternately, the dryer control module could include other means for periodically purging moisture from the desiccant material.

In order for the purging process to operate successfully, the purge volumes are pressurized to a predetermined level, here at least 410 kPa. The service reservoirs 24, 26 supply air to the purge volumes during the pump-off process. When a purge volume is depleted, a purge volume supply valve 42, 44 is opened by the dryer controller 40. This allows pressurized air from the service reservoirs to flow into the depleted purge volume and refill the purge volume. In the preferred embodiment, the purge volumes of the two dryers 12, 14 alternate filling and purging.

In the preferred embodiment, the service reservoirs are monitored by the governor control 30. If the reservoirs 24, 26 are depleted to the predetermined level (about 410 kPa), the governor control 30 switches the pump-off control valve 32 to a closed position. Concurrently, the supply tank switches flow from the pump-off process to the service reservoirs, and the service reservoirs are once again filled to the desired level (830 kPa). This cycle is repeated until the driver terminates the pump-off operation and returns the truck to normal operating mode. Accordingly, the compressor runs above the 100–200 kPa range only when filling the reservoirs. The remainder of the time the compressor runs in the more efficient lower pressure range.

In the preferred embodiment, the service reservoirs are the same reservoirs used by the truck to operate the brakes. Alternately, a separate, dedicated reservoir can be used for the pump-off process. Additionally, as noted above, the purge volumes could be external to the dryers, rather than integrated within the dryers.

With reference to FIG. 2, and continuing reference to FIG. 1, the cycle is summarized. In step 50, the driver initiates the pump-off mode. In step 52, the service reservoirs are filled to a predetermined level, e.g., 830 kPa, in step 54 the pressure monitor 28 checks the reservoirs to see if the reservoirs have been pressurized to a desired level, here 830 kPa. If the reservoirs are at pressure, the air supply is switched from the reservoirs to the off-load process in step 56. In step 58 the dryers alternate drying and purging until the reservoirs have been depleted to predetermined level, e.g., 410 kPa, at which point, in step 60, air flow is switched back to the reservoirs.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A system for providing pressure to assist a cargo off-load system comprising:
    an air compressor for supplying low pressure air to the cargo off-load system;
    a first dryer operatively connected with the air compressor for removing moisture from air supplied thereby; and
    a service reservoir for providing high pressure compressed air for purging the dryer during a cargo off-load pump-off process.

2. The system as set forth in claim 1, further including a line extending from the air compressor to the cargo off-load system.

3. The system as set forth in claim 2, further including:
    a second dryer operating in parallel with the first dryer, operatively alternating with the first dryer;
    a control device that activates the cargo off-load system; and
    a governor control that monitors a pressure in the service reservoir.

4. The system as set forth in claim 3, wherein the dryers remove moisture from air that is fed to a supply tank.

5. The system as set forth in claim 4, wherein the governor control manages a pump-off valve to direct air from the dryers to the cargo off-load system if the governor control senses that the pressure in the reservoir is above a predetermined level.

6. The system as set forth in claim 5, wherein the governor control manages the pump-off valve to direct air from the dryers to the reservoir if the pressure in the reservoir is less than the predetermined level.

7. A method of off-loading a product from a tanker truck comprising the steps of:
    supplying pressurized air to a product tank for off-loading;

drying air that pressurizes the product tank with a first dryer; and, purging moisture from the first dryer with air from a service reservoir.

8. The method as set forth in claim 7, further including performing the steps of supplying, drying, and purging when the tanker truck is in a parked condition.

9. The method as set forth in claim 7, wherein the step of supplying includes pressurizing a supply tank to a predetermined level.

10. The method as set forth in claim 7, further including the step of operating the product tank at a pressure lower than a pressure in the service reservoir.

11. The method as set forth in claim 10, further including the steps of:

compressing air for the supply tank; and, compressing air for the service reservoir.

12. The method as set forth in claim 7, wherein the step of purging includes directing air from the service reservoir as a reverse flow through the dryer.

13. The method as set forth in claim 7, wherein the step of purging includes:

communicating air from the service reservoir to fill a purge volume of the first dryer;

communicating air from the service reservoir to fill a purge volume of the second dryer;

filling the purge volume of the first dryer while the second dryer is purging; and, filling the purge volume of the second dryer while the first dryer is purging.

14. The method as set forth in claim 7, further including the step of operating the product tank at a pressure lower than the service reservoir, including switching airflow from the product tank to the service reservoir when the service reservoir reaches a predetermined level.

15. The method as set forth in claim 7, further including the step of preventing the supplying, drying, and purging steps when the truck is not in a parked condition.

16. A tanker truck comprising:

a cargo hold for holding a flowable bulk cargo; and a pressurized off-load assist system including:

an air compressor that alternately compresses air at high and low pressures, the high pressure being used to pressurize a service reservoir, and the low pressure being used to pressurize an off-load tank.

17. The tanker truck as set forth in claim 16, wherein the off-load assist system further includes:

at least one air dryer to remove moisture from the compressed air; and an off-load valve that connects the off-load assist system to the off-load tank, the valve opening when the compressor is operating at low pressure, and closing when the compressor is operating at high pressure.

18. The tanker truck as set forth in claim 17, further including a switch that causes the compressor to fill the service reservoir when the pressure in the reservoir reaches a predetermined level and causes the compressor to supply the off-load tank when the pressure in the service reservoir reaches a second predetermined level.

19. The tanker truck as set forth in claim 18, further comprising an interlock that precludes use of the off-load system unless a park brake of the tanker truck is actuated.

20. A method of reducing the operating load of a compressor during a cargo off-load process comprising the steps of:

compressing air at a first pressure to fill a service reservoir with pressurized air;

isolating the service reservoir from additional pressurized air;

compressing air at a second pressure for an off-load system; and purging moisture from an air dryer desiccant bed with the pressurized air in the service reservoir.

21. The method as set forth in claim 20 wherein the second pressure is less than the first pressure.

22. The method as set forth in claim 20 wherein the step of isolating the service reservoir comprises closing a service tank check valve.

23. A system for reducing the operating load of a compressor during a cargo off-load system comprising:

a service reservoir;

a compressor in communication with the service reservoir;

a cargo off-load system in communication with the compressor; and a control mechanism that isolates the service reservoir from the compressor during operation of the cargo off-load system.

24. The system as set forth in claim 23 wherein the service reservoir is in communication with an air dryer and purges moisture from the air dryer while being isolated from the compressor.

25. The system as set forth in claim 23 wherein the control mechanism is a service tank check valve.

26. The system as set forth in claim 23 wherein the compressor operates at a first pressure while in communication with and the service reservoir and the compressor operates at a second pressure while in communication with the cargo off-load system.

27. The system as set forth in claim 26 wherein the first pressure is greater than the second pressure.

28. The system as set forth in claim 1, wherein the air compressor supplies the low pressure air to the cargo off-load system as a function of a mode of a park brake.

* * * * *